Feb. 9, 1965 C. J. SCRIBNER ETAL 3,169,244
MOVING TARGET SIMULATOR
Filed June 21, 1963 7 Sheets-Sheet 1
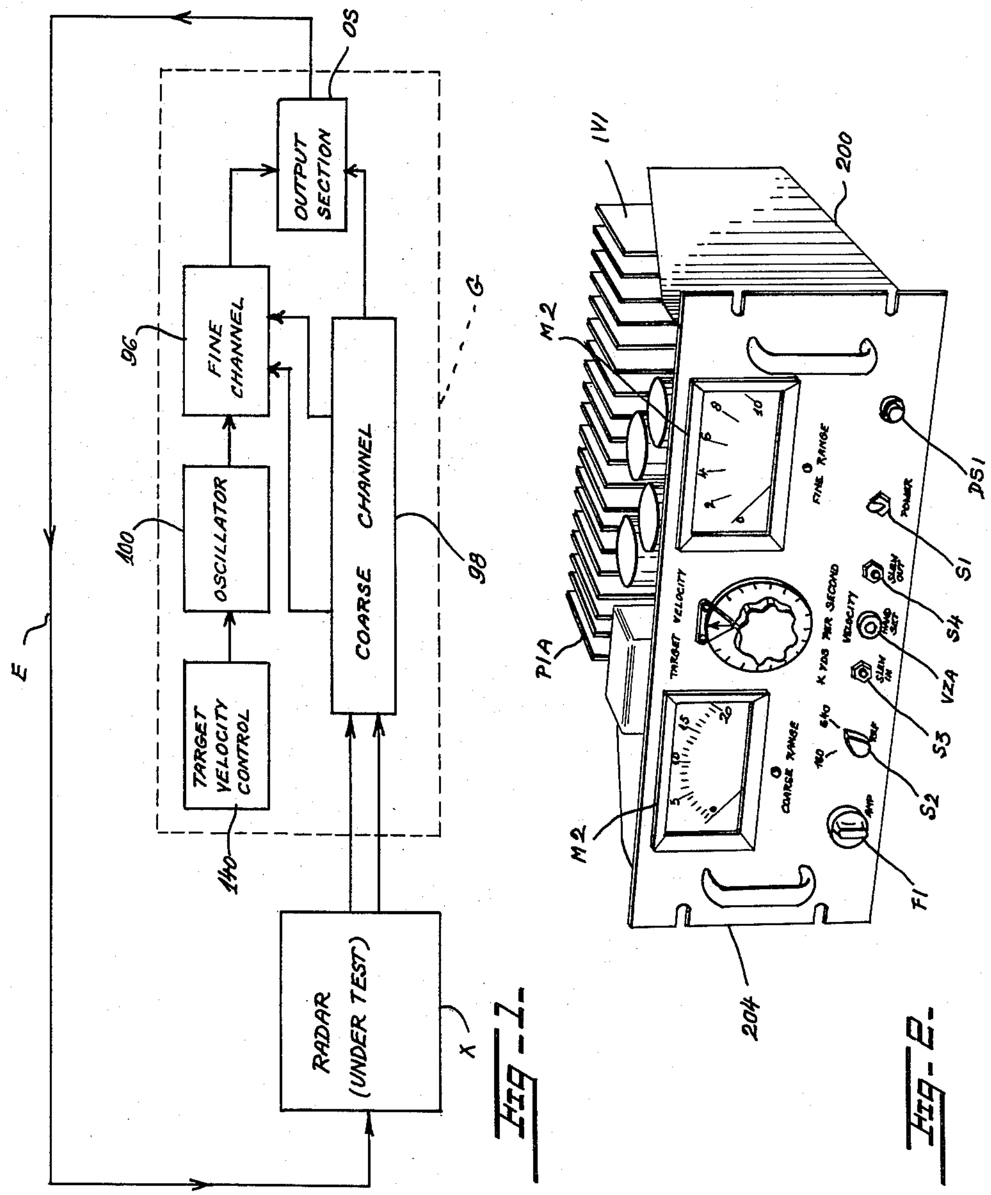
INVENTORS
COY J. SCRIBNER &
ALFRED CORBIN
BY
Polachek & Saulsbury
ATTORNEYS.

INVENTORS
COY J. SCRIBNER &
ALFRED CORBIN
BY Polachek & Saulsbury
ATTORNEYS.

Feb. 9, 1965 C. J. SCRIBNER ETAL 3,169,244

MOVING TARGET SIMULATOR

Filed June 21, 1963 7 Sheets-Sheet 3

INVENTORS
COY J. SCRIBNER &
ALFRED CORBIN
BY Polachek & Saulsbury
ATTORNEYS.

MOVING TARGET SIMULATOR

Filed June 21, 1963 7 Sheets-Sheet 4

INVENTORS
COY J. SCRIBNER &
ALFRED CORBIN
BY Polachek & Saulsbury
ATTORNEYS.

INVENTORS
COY J. SCRIBNER &
ALFRED CORBIN
BY Polachek & Saulsbury
ATTORNEYS.

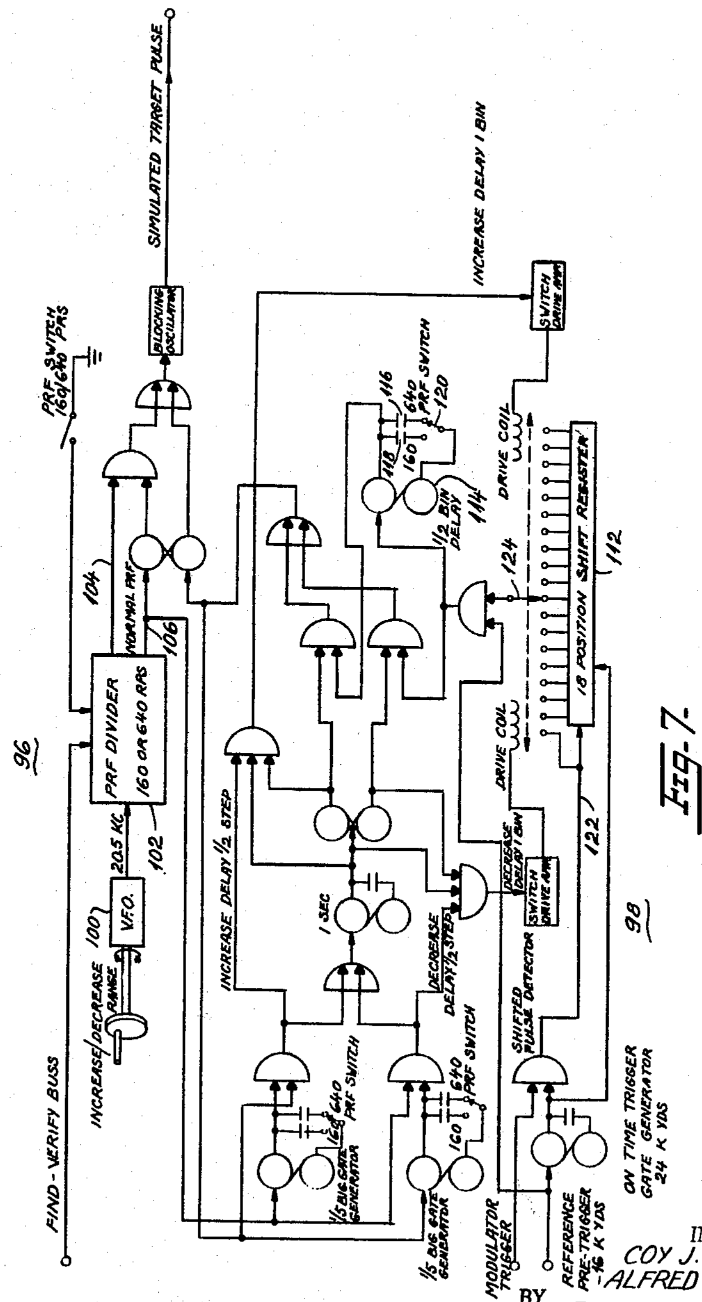
INVENTORS
COY J. SCRIBNER &
ALFRED CORBIN
BY
Polachek & Saulsbury
ATTORNEYS.

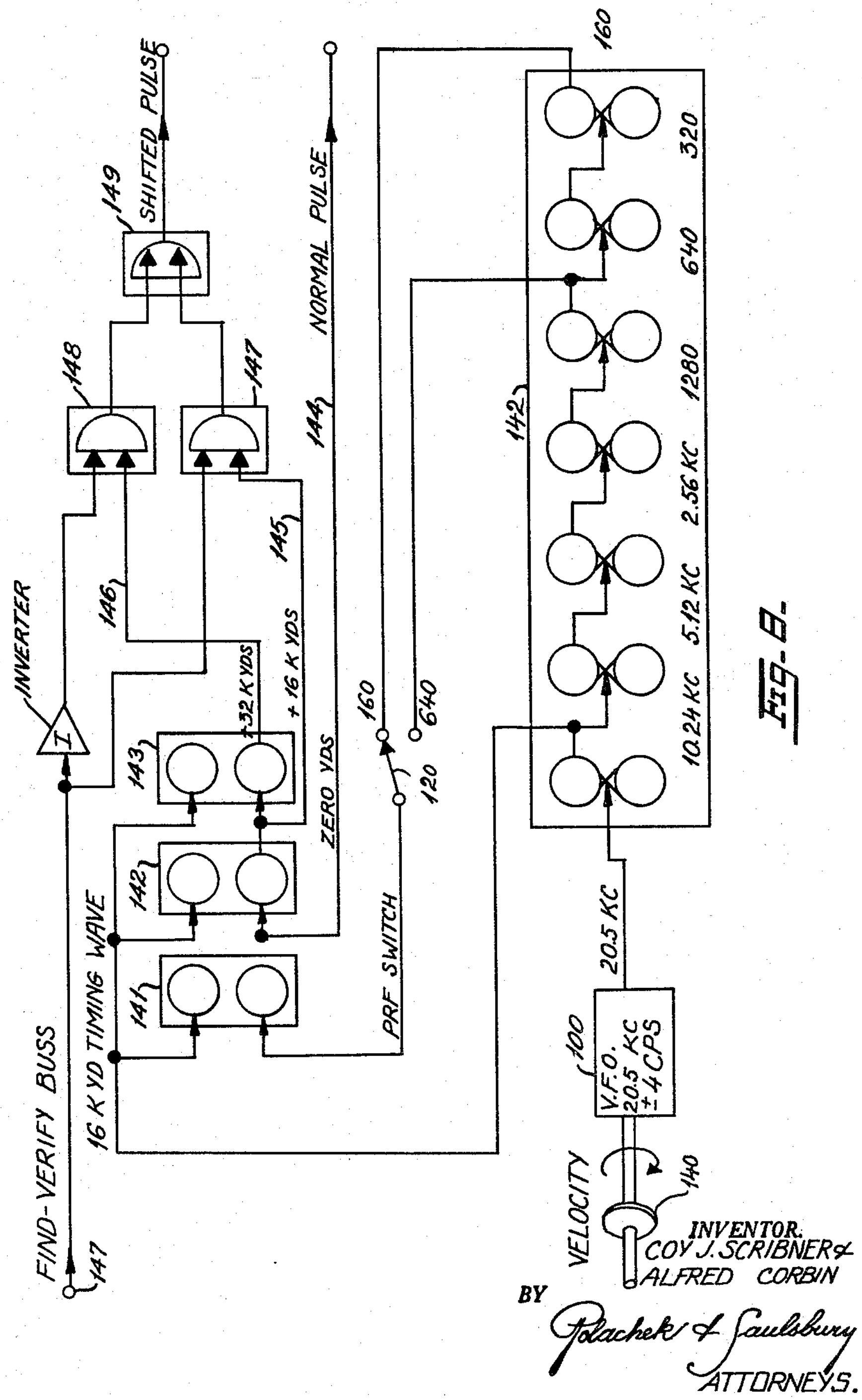
INVENTOR.
COY J. SCRIBNER &
ALFRED CORBIN
BY
Polachek & Saulsbury
ATTORNEYS.

3,169,244

MOVING TARGET SIMULATOR

Coy J. Scribner and Alfred Corbin, Mary Esther, Fla., assignors to Metric Systems Corporation, Fort Walton Beach, Fla., a corporation of Florida Filed June 21, 1963, Ser. No. 289,688
3 Claims. (Cl. 343—17.7)

This invention relates to moving target simulators, and more particularly to test signal generators for simulating the action of a radar target at extended ranges.

The invention provides a moving target simulator housed in a single package, suitable for rack or cabinet mounting, having input and output terminals adapted to be connected to radars of the type including AN/FPS-16(V), AN/FPQ-6, and the AN/TPQ-16.

Certain radars, such as the AN/FPS-16, employ special techniques for tracking at extended ranges, i.e. beyond the range represented by one pulse repetition frequency (PRF) period. One such class of radar transmits, at programmed intervals, a "late" pulse, occurring in lieu of the normal output, and several thousand yards after the normal output timing.

The moving target simulator of the invention receives the modulator trigger signal from a radar of this type and generates an "echo" train. The time phase of the echo train is a function of simulated range, which in turn, is computed as a function of the target velocity control setting. Each time a shifted modulator trigger is received by the simulator, the echo train produces a shifted output pulse after the appropriate delay. The simulator operates at a selected PRF of either 160 or 640 pulses per second, for example.

The invention is basically a programmed pulse generator which produces an output pulse train similar to the input train, but delayed in time. To simplify understanding of operation, the simulator may be considered as two separate delay generators—fine and coarse. The fine channel generates a precise train of delayed pulses at the radar pulse repetition frequency. Although the fine pulse train is precise to a fraction of a microsecond, the zone position of a given output pulse is ambiguous.

The coarse delay channel generates an unambiguous delayed pulse train, capable of up to 18 zones of delay, with an accuracy of about ½ zone. The simulator output section makes use of both the fine and coarse channels to produce a single unambiguous pulse train with the accuracy of the fine channel.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a circuit diagram in block form of the invention.

FIG. 2 is a perspective view of the simulator unit itself.

Figure 5:
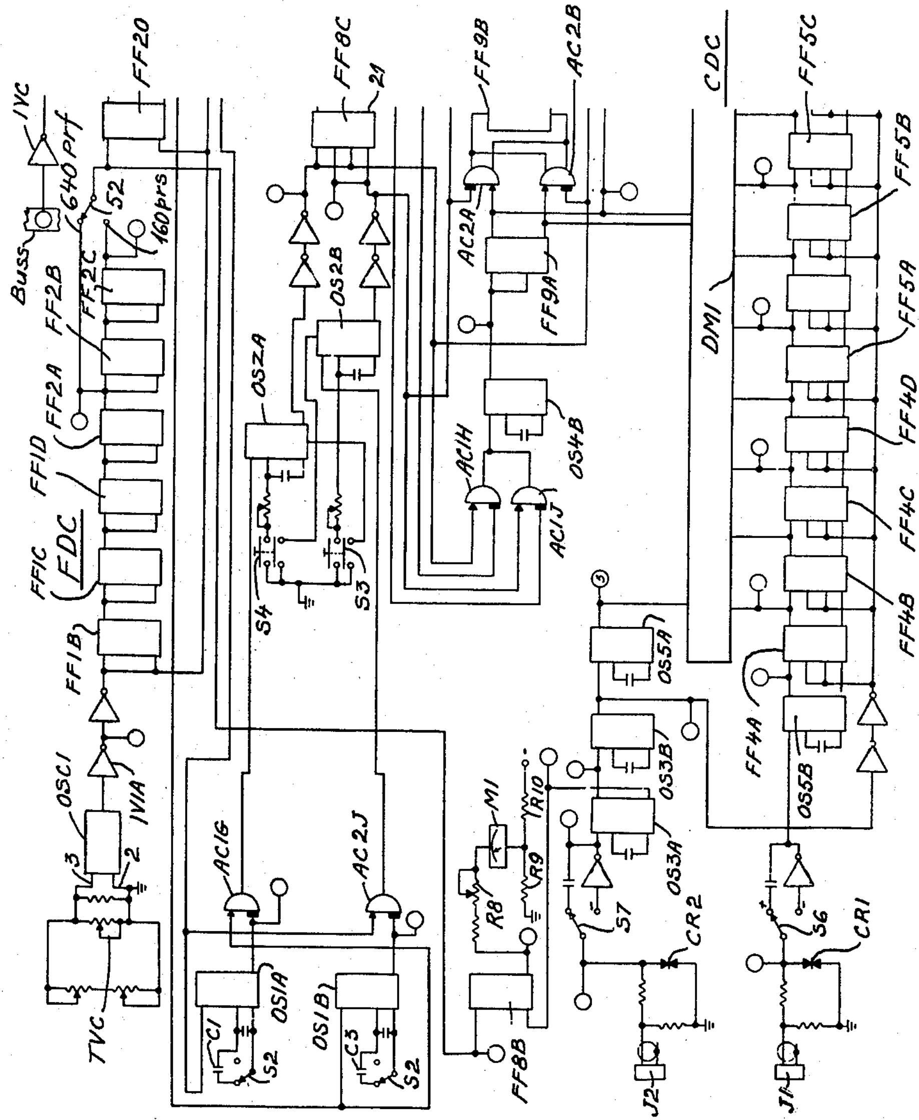
Figure 6:
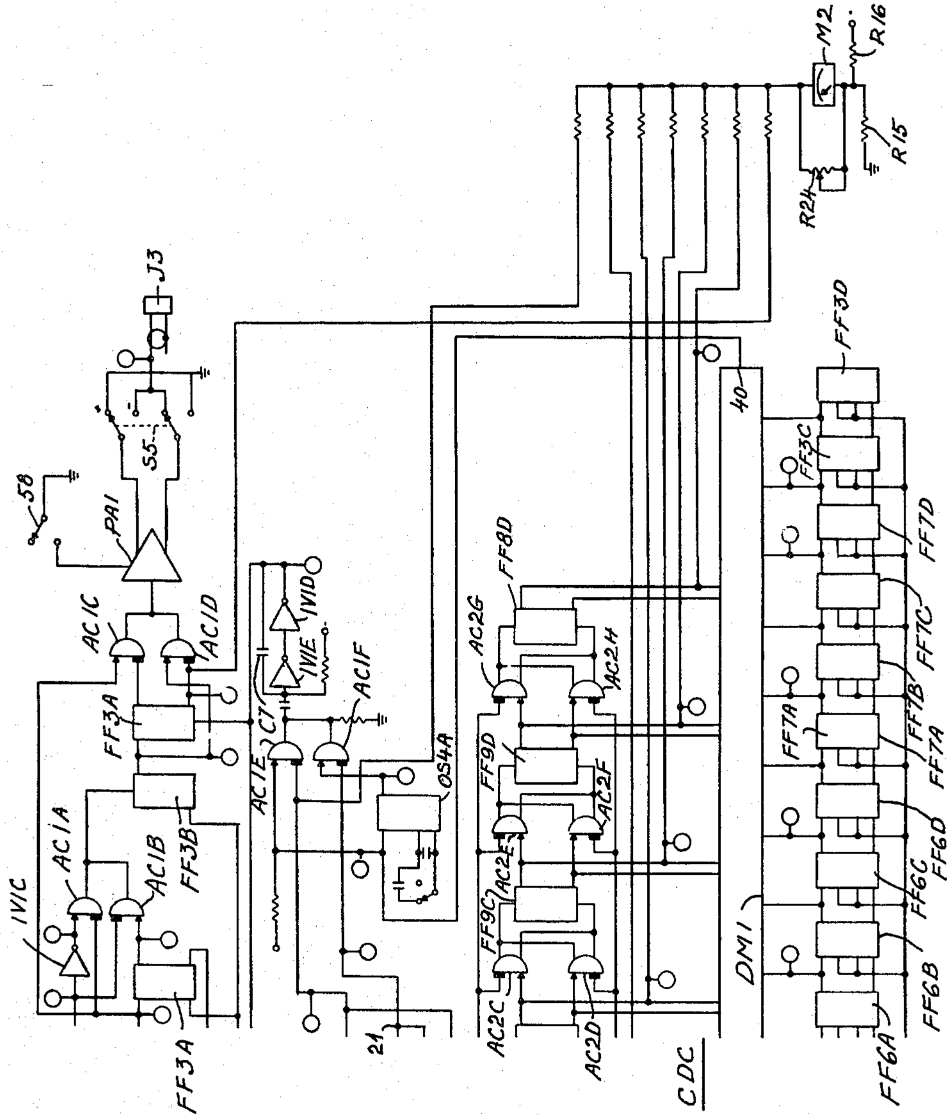

FIGS. 5 and 6 comprise a logic diagram of the moving target simulator circuit per se.

FIG. 7 is a block diagram of a modification of the invention.

FIG. 8 is a block diagram of the pulse repetition frequency divider of FIG. 7.

As shown in FIG. 1, a moving target simulator G illustrative of the invention is connected to the output circuit of the radar X (under test) of the extended range type. The simulator comprises a programmed pulse generator for producing an output train of "echo" pulses similar to the input train of radar signal pulses, but delayed in time, that is fed back to such radar by lead E. The generator includes a fine channel (FDC) 96 and a coarse channel (CDC) 98. The fine channel 96 generates a precise train of delayed pulses at radar pulse repetition frequency (PRF), precise to a fraction of a microsecond, the zone position of a given output pulse being ambiguous. The fine channel 96 has associated therewith an oscillator (OSC-1) 100 to the circuit of which is connected a target velocity control (TVC) 140. The coarse channel 98 generates an unambiguous delayed pulse train, capable of a plurality of zones of delay, with an accuracy of about ½ zone. The generator finally includes an output section OS for combining such fine and coarse channels to produce a single unambiguous pulse train with the accuracy of the fine channel 96.

The simulator, FIGS. 1–5, comprises a chassis 200 on the base 202 of which are mounted the electronic components, and a front panel 204. All major operating controls are mounted on the front panel. Controls of less frequent usage are located on the rear of the chassis. The following controls are panel mounted: main power switch S1, PRF selector switch S2, slew in switch S3, slew out switch S4, target velocity control TVC, and velocity zero adjustment VZA.

The following indicators are also located on the front panel: fine range meter M1, coarse range meter M2, power "on" light DS1, and blown fuse indicator F1.

On the rear edge of the chassis are mounted the following controls: modulator trigger polarity switch S6, pre-trigger polarity switch S7, output pulse polarity switch S5, and output pulse width selector switch S8.

Figure 3:
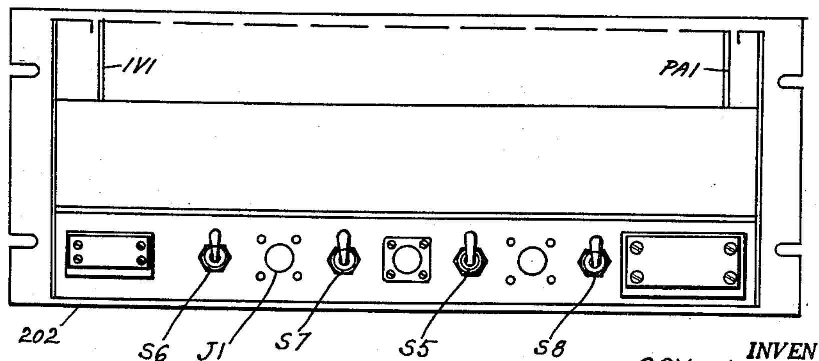
FIG. 3 is a fragmentary rear elevation thereof.
Figure 4:
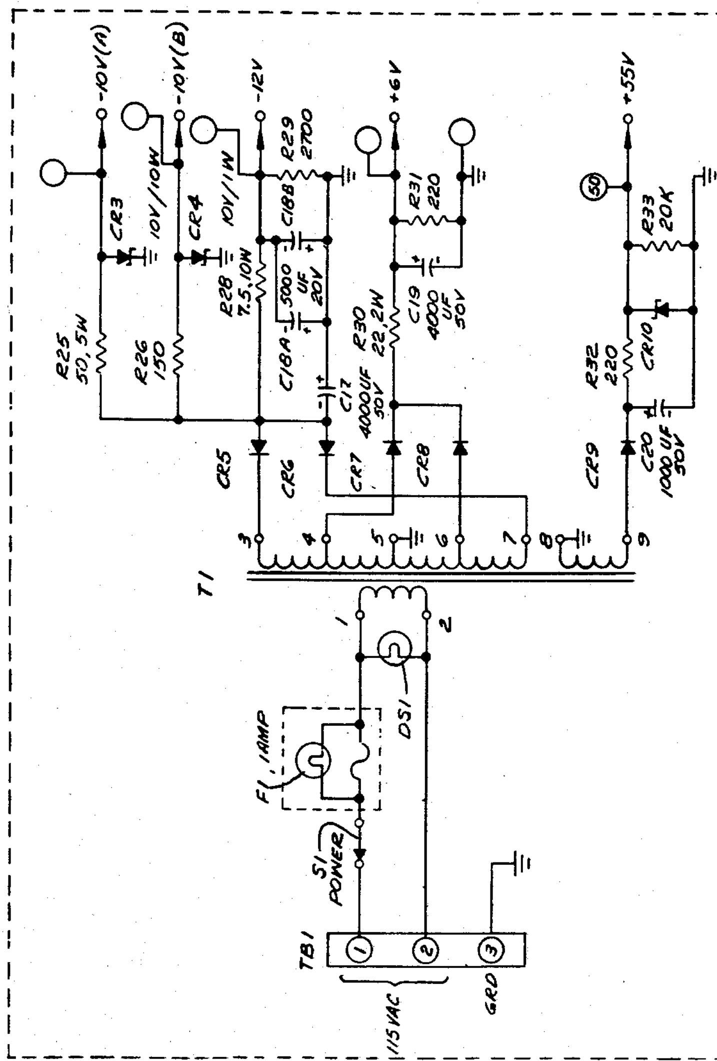
FIG. 4 is a diagram of the power supply circuit.

The main power switch S1 controls the A.C. input to a self-contained power supply, FIG. 4. The PRF selector switch S2 controls internal programming for use with either 160 or 640 p.p.s. radar PRF. The slew in/slew out switches S3/S4, when depressed, cause simulated range increases or decreases in steps of one zone at approximately ten steps per second. The target velocity control TVC is provided with a calibrated dial, the selected position of which determines the simulated range rate between limits of 40,000 yards per second. The dial is calibrated in 1,000 yards per second. When the target velocity control is zero, the velocity zero calibration adjustment control is used to trim out drift of the simulated target position.

Switch positions of the mod-trigger and pre-trigger polarity switches S6 and S7 enable the simulator to operate with positive or negative input pulses, as selected. The output pulse polarity switch S5 governs the polarity of the output pulse train. The output pulse width selector switch S8 controls selection of 0.25 or 1.00 microsecond output pulse width.

One the simulator is properly connected via input receptacles J1 and J2, FIG. 5, to the radar, operation is fully automatic, requiring only initial settings of target range and velocity. The simulator requires only a few seconds warm-up time, after which the radar acquires the simulated echo via output receptacle J3, FIG. 6.

By the use of the slew switches S3, S4 and observation of the coarse range meter M2, the echo may be initially set to the approximate desired range. For finer initial range setting, the target velocity control TVC may be used in conjunction with the fine range meter M1 to set the echo to any desired range with an overall readout accuracy of about 20,000 yards.

It is important to note that both the fine and coarse indicators M1 and M2 are calibrated in zones, rather than yards. At 160 PRF, one zone equals 1,024,000 yards, while at 640 PRF one zone equals 256,000 yards.

The fine delay channel FDC includes a pulse repetition frequency divider comprising flip-flops 1B through 3A. Oscillator OSC–1 operates at a nominal frequency of 10.25 kc. that is divided by 16 or 64 to produce the required 640 or 160 p.p.s. pulse rates, available at the terminals of the PRF selector switch S2.

Flip-flop FF2D is set by the selected 160 or 640 p.p.s., and reset by 10.25 K p.p.s., producing an output train at the selected PRF. The pulses are square, negative-going, with a duration of 16,000 yards. The trailing edges of such pulse train may be considered to be the "on time" output of the fine delay channel. The leading edges, being 16,000 yards in advance, are referred to as the "simulated pre-trigger."

In general, all signals of timing significance are considered with respect to their positive going edges. The pulse gates and flip-flops respond to positive transients and positive control logic.

The on-time PRF (flip-flop FF2D output) is fed to the set input of flip-flop FF3A which, in turn, is reset by 10.25K p.p.s., producing a delay pulse train, similar to the on-time train, but delayed 16,000 yards.

The on-time and +16K yard trains are fed to pulse gates AC1A and AC1B, respectively. Pulse gate AC1A is enabled in the "normal" mode, while pulse gate AC1B is enabled in the find-verify mode. The pulse gate outputs are mixed, resulting in an on-time pulse train in the normal mode and a +16K yard train in find-verify.

This signal is fed to the set input of flip-flop FF3B, 10.25K p.p.s., delaying the output an additional 16K yards. The output of flip-flop FF3B is referred to as the "delayed train." The positive (trailing) edges of the delayed train are at −16K yards in "normal" and +32K yards in "find-verify."

The delay train and the on-time train are the net output of the fine delay channel. These pulse trains occur at the selected PRF when the oscillator OSC–1 frequency is exactly 10.25 kc. When OSC–1 frequency is changed slightly by the target velocity control, the time phase of the fine delay channel output changes at the simulated velocity.

For single zone simultation, the on-time output of the fine delay channel FDC is sufficient.

In the overall operation of this multi-zone simulator, the on-time PRF is ordinarily connected to the radar output. When the radar transmits a delayed pulse, however, the delayed (simulated) PRF is momentarily used. The time delay, in zones, from the transmission of a delayed trigger, the selection of the delayed simulator output is determined by coarse delay channel CDC.

The coarse delay channel CDC serves two main purposes—selecting the delayed PRF train at the correct time, and computing and updating the simulated zone of operation.

Three major sections make up the coarse delay channel. They are:

(1) The information shift register, including flip-flops FF4 through FF7 and FF3C through FF3D.

(2) The zone counter and pickoff circuits, including FF9 and FF8D, and decoder matrix DM1.

(3) The interference detectors and advance/retard controls, including one-shot multi-vibrators OS1, OS2, OS4 and associated circuitry.

Overall operation of the coarse delay channel CDC is as follows:

The modulator triggers are examined at the input to the shift register. If the trigger is "on time," flip-flop FF4A is set. If the trigger is delayed, flip-flop FF4A is reset. The "state" of flip-flop FF4A thus represents the condition of the most recent modulator trigger pulse. This information is shifted to the right in the register, one shift occurring for each modulator pulse. Since the register consists of 18 stages, it is capable of retaining the memory of the condition of the past 18 modulator pulses.

To simulate coarsely the modulator pattern for *n*th zone simulation, it is necessary simply to pick off the pattern at the output of the *n*th flip-flop in the register. This is accomplished by the action of the zone counter and the decoder matrix DM1. The zone counter is a five-stage up/down binary counter which at all times registers the current zone of operation. The five binary output lines and their complements are fed to the decoder matrix in which the five bit word is decoded into 18 sequential lines. Each of the 18 decoded lines is compared (AND logic) with the corresponding information line from the shift register. The resulting output of the decoder matrix is a train of pulses which duplicates the information pattern at the selected stage in the shift register. This pulse train is later used in the selection of the on-time or delayed fine delay train.

To avoid ambiguity in the selection of normal or delayed output pulses, coarse delay is computed in approximately half-zone increments. As was previously illustrated, the output of the decoder matrix is used as the coarse delay pattern; however, an additional half-zone delay may be added by the action of one-shot multivibrator OS4A and pulse gates AC1E and AC1F, controlled by flip-flop FF8C. If the situation requires the half-zone delay, pulse gate AC1F is enabled, using the output of OS4A, which is the decoder matrix output (+½ zone). If the decoder matrix output is to be used directly, pulse gate AC1E is enabled.

Updating the zone counted is accomplished by the logical operation of one-shot multi-vibrators OS1, OS2, flip-flop FF8C, one-shot OS4B, and the associated pulse gates. The logic is such that an output pulse from one-shot multi-vibrator OS2A causes a ½ zone decrease in coarse delay, and an output pulse from one-shot multivibrator OS2B causes a ½ zone increase.

Flip-flop FF8C may be referred to as the "half-zone delay control." When flip-flop FF8C is set (pin 21 positive), output of the decoder matrix is delayed ½ zone; when flip-flop FF8C is reset, the decoder matrix output is used directly.

When an "increase ½ zone" pulse is received from one-shot multi-vibrator OS2B, one of two possible sequences will occur;

(1) If flip-flop FF8C is in the "set" state, it will be reset, and the zone counted will receive one "count up" pulse.

(2) If flip-flop FF8C is in the "reset" state, it will be set.

A "decrease ½ zone" command from one-shot multivibrator OS2A, likewise, will produce one of two possible actions.

(1) If flip-flop FF8C is in the "set" state, it will be reset.

(2) If flip-flop FF8C is in the "reset" state, it will be set, and the zone counter will receive one "count down" pulse.

The inputs to one-shot multi-vibrators OS2A and OS2B are generated by time comparison gates AC1G and AC2J, controlled by one-shot multi-vibrators OS1A and OS1B.

One-shot multi-vibrator OS1A is triggered by the coarse delay pulse train, and generates an enabling gate lasting .2 zone. One-shot multi-vibrator OS1B generates enabling gates of .2 zone duration, triggered by the fine delay PRF. The gating signals are applied to the control inputs of gates AC1G and AC2J. The pulse inputs to AC1G and AC2J are the fine delay PRF and the coarse delay pulse train respectively. Overall operation is such that, with increasing range, an "increase" pulse is produced by gate AC2J when the fine delay PRF approaches to within .2 zone of the coarse train. Similarly, when range is decreasing, gate AC1G produces a "decrease" command when the fine delay PRF pulses approach .2 zone of the coarse delay train.

Operation of the coarse delay control loop is such that a single pulse from gate AC1G or AC2J immediately causes the coarse delay to increase or decrease ½ zone, removing the .2 zone interference condition.

Using the coarse delay channel CDC for control information, and the fine delay PRF signals (on-time and shifted), the combination of flip-flop FF8A, gates AC1C and AC1D selectes the proper sequence of on-time or shifted pulses to drive the output amplifier PA1.

The coarse delay train received by flip-flop FF8A is a train of positive pulses, each pulse representing a command to select an on-time output. In the absence of a pulse from the coarse delay train, a shifted pulse is selected for the output.

Pulse gate AC1C is driven by the on-time PRF and is enabled when flip-flop FF8A is reset. Gate AC1D is driven by the shifted PRF and is enabled when gate FF8A is set.

For illustration, assume that all on-time pulses are to be transmitted. In this case the coarse delay train will be a solid train of pulses at the PRF rate, occurring in advance of the fine delay PRF. Each coarse train pulse resets flip-flop FF8A, enabling gate AC1C. The next on-time pulse passes through gate AC1C to the output amplifier PA1. The shifted pulse which immediately follows the transmitted on-time pulse sets gates FF8A, completing the cycle.

Assuming now that all shifted pulses are to be transmitted, no coarse delay pulses will be present. In this case flip-flop FF8A will remain in the set state, enabling gate AC1D. With gate AC1D enabled and gate AC1C blocked, only the shifted PRF will be transmitted.

Meters M1 and M2 present the simulated range in both fine (ambiguous) and coarse (unambiguous) form. The fine range indication uses a single flop-flop to measure the relative phase of the radar pre-trigger and simulated pre-trigger.

The leading edge of the output of one-shot multivibrator OS3A, which is coincident with the radar pre-trigger, resets flip-flop FF8B. At some later time, depending on simulated range, the simulated pre-trigger sets flip-flop FF8B. The length of time flip-flop FF8B remains in reset is an exact measure of range. To indicate this time duration, or duty cycle, a voltmeter circuit is connected to the output of flip-flop FF8B, scaled to indicate 1 zone if flip-flop FF8B is continuously in reset, and to read zero, if flip-flop FF8B is continuously in the set state.

The coarse range indicator M2 makes a D.C. current summation of all the components of simulated range and presents the sum current as an overall indication with a full scale of 20 zones.

All active circuits are packaged as plug-in subassemblies Several of the plug-in circuits, such as the flip-flops, are of standard design and are used in many places in the overall system. For a better understanding of detailed system operation, it is advisable to become familiar with the circuit details of the plug-in units. The plug-in units are described in detail below.

All D.C. voltages are provided by a single transformer T1, FIG. 4, and several rectifier-filter combinations.

The +6 volt and −12 volt supplies each make use of conventional full-wave rectifiers and RC filters.

The +55 volt D.C. supply to the output amplifier is designed for very low average drain and uses a half-wave rectifier and capacitor filter. Zener diode CR10 stabilizes the voltage at +55 volts.

A separate, zener regulated, −10 volt line is used to feed the 10.25 kc. oscillator OSC–1. This line derives its power from the main −12 volt supply.

An additional −10 volt zener regulated line is used to supply flip-flop FF8 and FF9 to stabilize the range meter circuits.

As is usually the case in digital electronics, the system makes use of a relatively large number of a few standard circuits. Several of the standard boards are internally subdivided into independent channels. All circuit boards of a given type are interchangeable.

All logic circuits are of a binary nature operating between zero and nominal −10 volts D.C. In general, positive A.C. pulse logic is used, in which positive signal transients are coupled through pulse gates. The gates are enabled by the zero D.C. level, and inhibited by the −10 volt level. Saturated circuit design is used throughout the system.

In considering operation of the circuit, FIGS. 5 and 6, in detail, fine delay PRF is controlled by oscillator OSC–1, a stable 10.25 kc. oscillator whose frequency is steered within a narrow band to simulate target velocity. By varying the resistance between terminal 3 and ground 1, the oscillator frequency may be pulled approximately 2.5 cycles above and below the nominal frequency, to simulate range rates between plus and minus 40,000 yards per second. The output of oscillator OSC–1 is buffered by inverter IV1A and delivered to the PRF divider.

Flip-flops FF1B through FF2C comprise a $\frac{1}{64}$ frequency scaler. The scaler, or divider, is unclocked, operating in straight binary fashion. Each flip-flop responds to the positive-going edge of its input signal, changing state once for each input cycle. The outputs of the fourth and sixth stages of the counter are brought to PRF selector switch S2. The selected PRF of 160 or 640 pulses per second feeds the set input of flip-flop FF2D.

Flip-flop FF2D is used as a "clocking" stage to eliminate much of the pulse jitter which may be present in the output of the binary counter. Each counter output pulse sets flip-flop FF2D, which remains "set" until reset by the next 10.25K p.p.s. pulse. The resulting output of flip-flop FF2D is a train of negative pulses at the selected PRF, each pulse having a duration of 1/10250, or 97.5 microseconds, equivalent to 16,000 yards. For timing purposes, only the positive-going trailing edge of the pulse is significant. This positive edge is referred to as the on-time PRF train.

The on-time PRF sets flip-flop FF3A, which is reset by the 10.25K p.p.s. signal. The output of flip-flop FF3A is similar to that of flip-flop FF2D, but delayed by precisely one cycle, or 16,000 yards.

Flip-flop FF3B produces the shifted PRF train. Since the shift must be either +16,000 yards or +32,000 yards for Normal and Find-Verify operation, flip-flop FF3B is set by either an on-time pulse, or by the delayed output of flip-flop FF3A. When set by the on-time pulse, the positive output of flip-flop FF3B occurs at +16,000 yards; when set by the +16,000 yard output of flip-flop FF3A, the output of FF3B goes positive at +32,000 yards.

The selection of the input pulse to flip-flop FF3B is controlled by pulse gates AC1A and AC1B.

In Normal operation, the Find-Verify buss is at zero volts, producing a zero (enable) level at the control input to gate AC1A. Gate AC1A passes the on-time PRF to flip-flop FF3B.

In the Find-Verify mode, the buss is negative, producing a negative control input at gate AC1A and a zero control level at gate AC1B. In such case, the +16,000 yard PRF is passed through gate AC1B to flip-flop FF3B.

The modulator-trigger and pre-trigger pulses are fed to one-shot multi-vibrators OS5B and OS3A. To protect the input circuits against excessive signal level, the signals are clipped at a level of ±10 volts by double-ended zener diodes CR1 and CR2. To suit the input signal polarities, the signals are either used directly or inverted, according to the settings of the polarity switches S6 and S7.

The input logic is designed to set the first register flip-flop FF4A if the mod-trigger is normal, and to reset flip-flop FF4A if the mod-trigger is shifted (late).

The timing sequence is initiated by the pre-trigger signals occurring at −16,000 yards. The pre-trigger starts a sequence of pulses generated by one-shot multi-vibrators OS3A, OS3B and OS5A. OS3A generates a 125 microsecond delay. OS3B generates a 20 microsecond shift pulse starting at $T_{125}$; OS5A produces a 20 microsecond sampling pulse starting at $T_{145}$. The mod-trigger starts the 100 microsecond one-shot multi-vibrator OS5B. Each time a normal mod-trigger is received the set input to flip-flop FF4A is enabled at shift time, and flip-flop FF4A is set. When a late mod-trigger is received flip-flop FF4A is reset by the shift pulse and remains reset until the next normal mod-trigger.

Each shift clock pulse shifts the register information to the right one step. Thus the pattern of normal and late mod-trigger signals is delayed over a period of 1 to 18 zones through the register.

The decoder matrix circuit functionally acts as a selector switch, picking off the output of one of the 18 flip-flops in the shift register. If the simulated range is in the first zone, the output of flip-flop FF4A is selected. If the simulated range is in zone 2, the output of flip-flop FF4B is selected, and so forth.

The output of the decoder matrix, at pin 40, is a train of negative pulses, 20 microseconds wide. The presence of a pulse indicates the presence of a "normal" mod-trigger, delayed by the selected number of zones. As mentioned previously, the positive (trailing) edge of the pulse is significant.

The five flip-flops comprising the zone counter are connected as an unclocked binary counter. The coupling between stages is controlled by a set of pulse gates. It is easily demonstrated that a binary counter will count "up" or "down" depending on whether the set or reset output of each stage is used to drive succeeding stages.

In this application, the set outputs are used if gates AC2A, AC2C, AC2E, and AC2G are enabled by the "increase" D.C. buss. The reset outputs are used if gates AC2B, AC2D, AC2F and AC2H are enabled by the "decrease" buss.

Each time the "increase" or "decrease" buss is energized one-shot OS4B generates a single pulse, delayed a few microseconds to allow the gates to stabilize. The input pulse causes the counter to add or subtract one count in accordance with the command.

In the coarse delay control circuit one-shot multivibrators OS1A and OS1B generate positive gates which are nominally .2 zone wide. To compensate for the difference in zone width at the two PRF's the timing capacitors for one-shot multi-vibrators OS1A and OS1B are selected by the PRF selector switch.

One-shot multi-vibrator OS1A generates gates which are initiated by the output of the coarse delay system. These positive gates control gate AC1G which uses the PRF divider output for input signal. The function of gate AC1G is to produce a pulse if the PRF divider output occurs within a .2 zone after the coarse delay pulse. Normally, this condition will produce only a single pulse from gate AC1G, since the output of gate AC1G, in turn, removes the condition which allowed the pulse to be passed. Each time gate AC1G produces an output pulse, the coarse delay is decreased by ½ zone.

The action of gates AC2J and OS1B is identical to that of gates AC1G and OS1A, with the input signals cross-connected. In this combination, a pulse is generated through gate AC2J when the PRF divider output occurs within .2 zone before the coarse delay pulse timing. Each pulse from gate AS2J causes the coarse delay to be increased by ½ zone.

The actual control, or updating, of the coarse delay system, is performed by one-shots OS2A, OS2B, gates AC1H, AS1J, and flip-flop FF8C.

On receipt of an increase or decrease delay pulse, one-shots OS2A or OS2B will produce a positive output pulse .1 second wide. The leading edge of this pulse is used as the signal to the zone counter by way of gates AC1H and AC1J. The D.C. level of the pulse is used as the enabling voltage for the increase or decrease count control busses.

Flip-flop FF8C, the half-zone control flip-flop, changes state each time one-shot OS2A or OS2B produces an output pulse.

The logical operation of gates AC1H and AC1J is such that an increase command will cause the counter to increase one zone if flip-flop FF8C has been "on," and a decrease command will cause the counter to decrease one zone if flip-flop FF8C has been "off." The combination of this action and the fact that flop-flop FF8C changes state in each instance results in a net change of ½ zone increase or decrease in response to one-shots OS2B and OS2A.

The manual slew-in and slew-out switches S3 and S4, when depressed, remove the internal bias on the one-shot circuits, allowing them to free-run at about 10 p.p.s., producing a train of increase or decrease delay commands.

*Output pulse selection*

The coarse delay pulse train from the decoder matrix is fed to one-shot OS4A and to the input terminal of gate AC1E. The output of one-shot OS4A, ½ zone late, is fed to gate AC1F. The state of flip-flop FF8C controls the selection of signal to be used in the output pulse selection.

The mixed output of gates AC1E and AC1F is fed to cascaded inverters IV1E and IV1D. Positive-feedback capacitor C7 is connected across the inverters to widen the signal pulses in much the same manner as a one-shot.

The output of the cascaded inverters is used as the resetting signal to the output selection control flip-flop FF8A. When in the reset state flip-flop FF8A enables gate AC1C, passing an on-time pulse. Immediately afterward, the shifted PRF sets gate FF8A which remains set for the remainder of the PRF interval until the next coarse delay pulse (if present) resets it. If a coarse delay pulse is not present, flip-flop FF8A, in the set state, enables gate AC1D, passing a shifted PRF pulse.

The outputs of gates AC1C and AC1D are mixed and fed to the output amplifier PA1.

Peaking amplifier PA1 receives the short positive pulses from gates AC1C and AC1D, amplifies and shapes the pulses into the required form and level for coaxial line transmission. The amplifier output is transformer coupled to output polarity switch S5.

Pulse width of 1.0 or 0.25 microsecond is controlled by switch S8.

*Coarse range readout*

Each output line of the zone counter has a "weight" depending on its position in the binary counter. The first stage has a weighting factor of one zone, the second stage a weight of two zones, the third, four zones, and so forth.

The coarse range meter M2 is a simple digital-to-analog converter in which each of the counter output lines contributes a D.C. current directly proportional to its weighting. The most significant line, from the fifth stage, has a weighting factor of 16 times that of the least significant line; therefore, its voltage is applied to the meter through a resistor whose value is one-sixteenth that of the least significant line.

In addition to the five counter lines, the half-zone flip-flop contributes its half-zone component, and the "fine-range reminder" is contributed by flip-flop FF8A, with a weight of one zone.

The summation of all the component currents is applied to the coarse range indicator M2. The divider consisting of resistors R15 and R16 elevates the meter return potential to about —.2 volt to compensate for the zero offset voltage of the flip-flops. Resistor R24 is a meter sensitive control, acting simply as a meter bypass, and is set to provide full-scale sensitivity of 20 zones.

*Fine range readout*

Flip-flop FF8B is reset by the radar pre-trigger and set by the simulated pre-trigger continuously. It is graphically evident that the output duty cycle is an exact measure of the time in reset, and, in this case, a measure of simulated range. The duty cycle of flip-flop FF8B determines the average current through fine range indicator M1 which is adjusted, by resistor R8, to a full scale sensitivity of one zone. Resistors R9 and R10 provide the offset correction.

As pointed out above, late model radars, such as the FPS–16(V), AN/FPQ–6, AN/TPQ–18 and Metric Systems Corporation's MPQ–31, employ special techniques for tracking at extended ranges. A conventional radar tracking at 5000 miles would require a transmitter pulse repetition frequency of 13 pulses per second. Such a low PRF has several serious disadvantages: The AGC, range tracking loop and angle position loop servo bandwidths are markedly reduced, grossly limiting servo tracking performance; the average transmitter power is reduced; the acquisition capability of the radar system is seriously affected. In order to eliminate the disadvantages associated with a low pulse repetition frequency, a system for tracking "Nth time around" has been developed. The "Nth time around" tracker uses a high PRF without limiting the tracking range. When tracking "Nth time around," a large number of transmitter pulses (as many as 63 in the FPQ–6) may be radiated before the first echo is received.

A number of excellent radar range simulators are presently available for conventional radars, however, these simulators do not operate properly with multiple pulse interrogation. To properly simulate "Nth time around" tracking, the range simulator must be capable of delaying a train of pulses by an amount exceeding the pulse-to-pulse spacing. That is, the simulator must be capable of receiving several pulses at its input before producing the first delayed simulated echo pulse. Prior range simulators were not capable of responding to a second input pulse before the first pulse delay interval was completed.

The present invention satisfies such need for use with FPS–16(V), FPQ–6 and TPQ–16 radars, and is herein designated as a multiple bin "Nth time around" range simulator. It replaces the normal target by replacing the normal space link between the radar transmitter and the radar receiver. The simulator generates a highly precise variable delay corresponding to the time required for a radar pulse to travel to the target and return. The tracking radar operates as if it were tracking an actual target when it is actually tracking a simulated echo. The pulse train, which would normally be transmitted to the target, is fed into the range simulator where it is delayed by an amount up to 18 bins and then returned to the digital ranger. Up to 18 pulses may be propagating through the range simulator at any one time; effectively up to 18 pulses may be fed into the input of the range simulator before the first delayed pulse is received at the output.

The capability of handling multiple pulses causes the range simulator to be considerably more complicated than the average variable delay unit. If it were necessary to handle only one pulse at a time, a standard phantastron-type simulator might be used. Such a delay cannot be used, however, since subsequent pulses would be received at the input of the phantastron before the original delay interval was completed. The present range simulator has a maximum delay capability of 18 bins and a jitter not to exceed .05 microsecond. The maximum velocity is 32,000 yards per second.

Referring to FIG. 7, as pointed out above, the range simulator is divided into two major blocks or channels, the fine delay channel 96 and the coarse delay channel 98. The fine delay channel generates very accurate and precise pulses at a rate of either 160 or 640 pulses per second but the positions of these pulses are ambiguous. The coarse delay channel generates unambiguous pulses but produces a delay whose accuracy is limited to one-half bin. The fine and coarse delay channels are combined to produce a single, very precise, unambiguous output pulse.

In the fine delay channel 96, variable frequency oscillator 100 produces a simulated range rate. The simulated echo will move at a rate proportional to the difference between the vfo frequency and 20.5 kc. If the vfo frequency is higher than 20.5 kc., the simulated echo will move outward in range; if the vfo frequency is lower than 20.5 kc., the simulated echo will move inward in range. The vfo outputs are counted down by variable PRF divider 102 which may be set to produce an output PRF of either 160 or 640 pulses per second. One of the two PRF's will be selected corresponding to the PRF being used by the radar. The PRF divider 102 produces two pulse trains, a normal and a shifted train, at its outputs 104 and 106, respectively. Either the normal or the shifted pulse is gated through one of the two AND gates and represents the simulated echo.

The shifted pulse from the PRF divider 102 is delayed from the normal echo pulse by either 16,000 or 32,000 yards. When the FPQ–6 Radar is in the Find or Verify mode, a shift spacing of exactly 16,000 yards is provided. When the radar is not in the Find-Verify mode, the shift interval is precisely 32,000 yards.

The coarse delay channel consists of 18-position shift register 112 and a half bin, one-shot delay 112. A timing capacitor 116 or 118 on the one shot is selected through switch 120 to cause the delay to be one-half bin, whether the PRF is 640 or 160. The 18-position shift register produces delays in increments of one PRF interval. With the half bin one-shot delay added to the shift register delay, over-all delays are produced in half bin intervals from 0 to 18 bins. The combination of the 18-position shift register and the half bin one-shot delay is the equivalent of a 36-position coarse delay.

In the over-all operation of the range simulator, a transmitter trigger is received at the input 122 of the 18-position shift register and propagates through the register at a fixed rate, depending on the PRF. N positions later, the transmitter trigger is received at the stepping switch wiper contact 124 where it is used to select one of the pulses produced by the fine delay channel. Two guard zone gates with associated circuit logic are used to determine whether the shift register position should be increased or decreased and whether the half bin one-shot delay should be in or out of the circuit. Guard zone gates are used to bracket each transmitter pulse. If the simulated video approaches an interference, the coarse delay is shifted and the interference is eliminated.

The decision to shift to either the increasing delay direction or the decreasing delay direction depends on which of the guard zone gates is energized. If the increase delay guard zone gate receives a pulse, the delay will be increased exactly one-half bin. This may or may not require advancing shift register stepping switch. If the half bin one-shot delay 114 is not in the circuit when the increase delay command is received, it is added to the circuit completing the operation of increasing the delay one-half step. If the half-bin one-shot delay is already in the circuit when the increase delay command is received, the register is advanced one full step (one full bin) and the half bin one-shot delay is removed from the circuit, making a net over-all delay increase of one-half bin. A similar series of events takes place when the decrease delay guard zone gate is energized.

When the radar is first turned on, the position of the shift register stepping switch 124 is arbitrary and the fine delay pulses may or may not be in an interfering condition. If the fine delay pulses are in an interfering condition, the interference is immediately eliminated by either increasing or decreasing the coarse delay by one-half step. The position of the shift register is indicated by 18 bin identification indicators.

As shown in FIG. 8, the high stability variable frequency oscillator 100 with a center frequency of 20,489.75 c.p.s. is used as the timing wave generator. One cycle at this frequency corresponds to a radar range of exactly 8000 yards. The vfo is adjustable over a range of ±4 c.p.s., about its center frequency. A frequency deviation of 4 c.p.s. corresponds to a range of 32,000 yards per second. The vfo frequency control knob 140 is calibrated in yards/second.

A seven stage binary counter 142 divides the output of the 20.5 kc./vfo to a PRF of 160 p.p.s. An operating PRF of either 640 or 160 by means of switch 120 may be selected from the seven stage binary counter. The PRF pulse triggers three flip-flops 141, 142, 143, in sequence, which select three consecutive pulses from a 16K yard timing pulse train. The output from the three flip-flops are pulses on three separate lines 144, 145, 146 with a spacing of precisely 16,000 yards. The first pulse to be produced is designated the "normal pulse" or zero yards. The second pulse is designated the "16K yard" shifted pulse, and the third pulse is designated the "32K yard" shifted pulse. The Find-Verify Buss 147 acting on gate 147 or 148, and gate 149 determines whether the output of the PRF divider 150 is the 16K yard or 32K yard pulse. If the Find-Verify Buss is energized, the 16K yard pulse is selected. If the Find-Verify Buss is not energized, the 32K yard pulse is the output pulse.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A moving target simulator for testing extended range radars, comprising a programmed pulse generator for producing an output train of "echo" pulses similar to an input train of radar signal pulses, but delayed in time, said generator including a fine channel and a coarse channel, said fine channel generating a precise train of delayed pulses at radar pulse repetition frequency, precise to a fraction of a microsecond, the zone position of a given output pulse being ambiguous; and said coarse channel generating an unambiguous delayed pulse train, capable of a plurality of zones of delay, with an accuracy of about ½ zone; and an output section combining said fine and coarse channels to produce a single unambiguous pulse train with the accuracy of the fine channel.

2. A moving target simulator of the type set forth, comprising, in combination, a fine delay channel including an oscillator circuit, a PRF divider connected to said oscillator circuit, a PRF selector switch associated with said divider, pulse delay and find-verify circuits connected to said switch, a mixer and A.C. AND gate circuit connected to said switch, a coarse delay channel operatively associated with said gate circuit, an amplifier connected to said gate circuit, a pulse width selector connected to said amplifier, an output polarity selector connected to said pulse width selector, and a target velocity control associated with said oscillator circuit.

3. A moving target selector as defined by claim 2, including coarse and fine range meters, and slew in and slew out switching circuits connected to said channels.

References Cited by the Examiner

UNITED STATES PATENTS 3,018,478 1/62 Skillman et al. -------- 343—17.7

CHESTER L. JUSTUS, *Primary Examiner.*